United States Patent [19]
Nguyen et al.

[11] Patent Number: 5,345,255
[45] Date of Patent: Sep. 6, 1994

[54] ACTUATOR MECHANISM FOR A PLOTTER CARRIAGE

[75] Inventors: Patrick Nguyen, Walnut; Brian C. Preston, Placentia, all of Calif.

[73] Assignee: CalComp Inc., Anaheim, Calif.

[21] Appl. No.: 834,970

[22] Filed: Feb. 14, 1992

[51] Int. Cl.$^5$ .................. G01D 15/16; B43L 13/00
[52] U.S. Cl. ................... 346/139 R; 33/18.1
[58] Field of Search ............. 346/49, 139 R, 139 C; 33/18.1, 18.2, 32.3, 1 M; 395/103–105, 111; B43L 13/00; G01D 15/16

[56] References Cited

U.S. PATENT DOCUMENTS

| | | | |
|---|---|---|---|
| 4,426,783 | 1/1984 | Gerber et al. | 33/1 M |
| 4,500,890 | 2/1985 | Nicholas | 346/139 R X |
| 4,905,016 | 2/1990 | Kobayashi et al. | 346/139 R X |

FOREIGN PATENT DOCUMENTS 1-249398  10/1989  Japan ..................... B43L 13/00

Primary Examiner—Benjamin R. Fuller
Assistant Examiner—Alrick Bobb
Attorney, Agent, or Firm—Frederic P. Smith; William F. Porter, Jr.

[57] ABSTRACT

An actuator mechanism for a plotter carriage adaptable for use in either a pen plotter or a pencil plotter mode in which a coupler engages both a support for a pen holder and a support for a lead holder and a motor and an actuator arm coupled to the motor are provided for driving the coupler relative to a drawing media surface. An interlock and a sensor are provided to enable the motor, actuator arm and coupler to be coupled to a pencil actuator mechanism and to determine whether the plotter carriage is being used in a pen plotter or a pencil plotter mode.

9 Claims, 2 Drawing Sheets

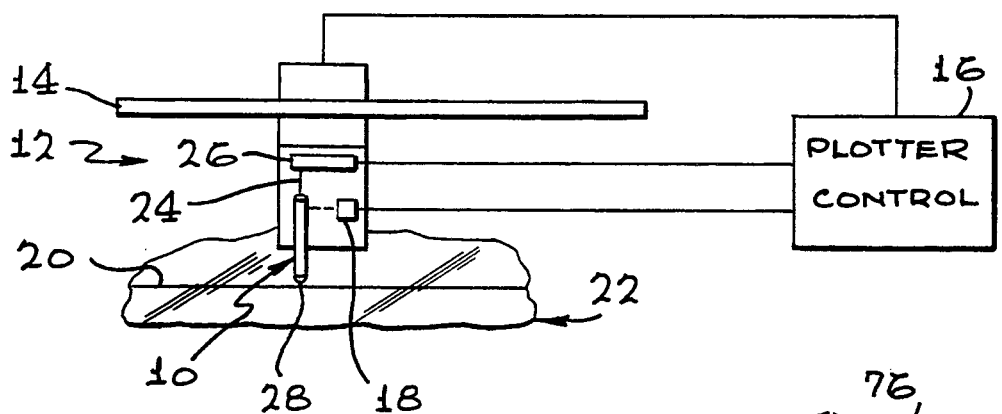
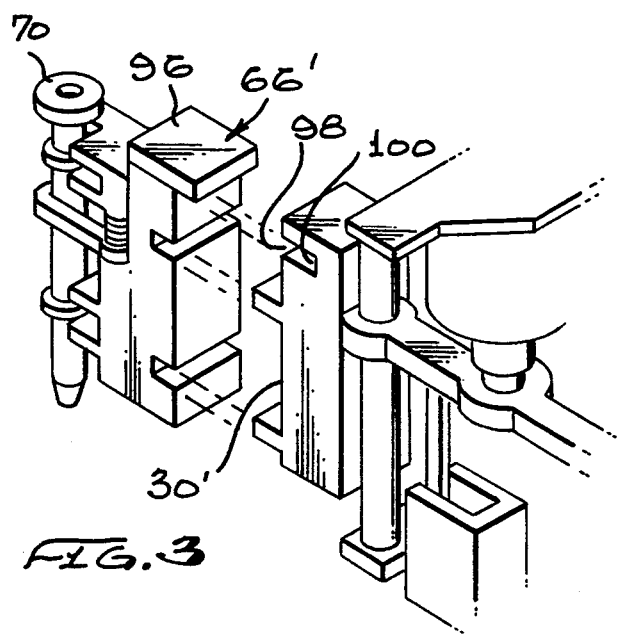
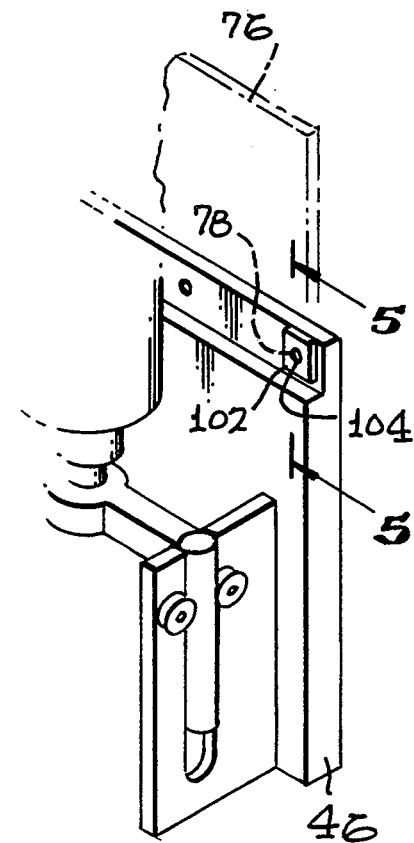
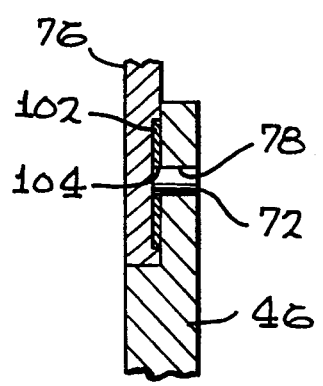

ACTUATOR MECHANISM FOR A PLOTTER CARRIAGE

BACKGROUND OF THE INVENTION

1. Field of the Invention

This invention relates to the field of plotters and, in particular, to an actuator mechanism for a plotter carriage adaptable for use in either a pen or pencil plotter mode.

2. Description of Related Art

Recent advances in computer hardware and software have moved designers and draftsmen from the drawing table to the computer screen. However sophisticated this technology has become, nevertheless the results of such effort must be moved from the computer to the surface of a drawing media in order to implement, to a large degree, the fruits of their labor. Thus, plotters capable of handling the output of such computer systems have been developed and are continually being upgraded. While the majority of uses for plotter technology have been in pen type plotters, nevertheless pencil type plotters have become increasingly popular due to the ability to be able to erase or make corrections or alterations to the drawings produced thereby. In many instances, however, it is advantageous to be able to use the same basic plotter mechanism to do both pen and pencil drawings. This is typically done in current plotters by replacing the entire carriage when changing from a pen to a pencil plot and vice versa. Since this requires two completely different sets of actuator mechanisms, obviously it is very expensive to proceed in this manner. In addition, it is a time consuming and complex operation to effect such complete change of carriages.

Thus, it is a primary object of the present invention to provide an improved actuator mechanism for a plotter carriage.

It is another object of the present invention to provide an improved actuator mechanism for a plotter carriage which enables either pen or pencil plots to be made.

It is a further object of the present invention to provide an improved actuator mechanism for a plotter carriage which can be quickly and easily changed from a pen to a pencil mode of plotting and vice versa.

It is still another object of the present invention to provide an improved actuator mechanism for a plotter carriage which significantly reduces the cost of converting a plotter from a pen to a pencil mode of plotting and vice versa.

SUMMARY OF THE INVENTION

An actuator mechanism for a plotter carriage adaptable for use in either a pen plotter or a pencil plotter mode in which a coupling means is adapted to engage with both support means for a pen holder and support means for a lead holder and means are provided for driving the coupling means relative to a drawing media surface. Interlock means and sensor means are provided to enable the driving and coupling means to be coupled to a pencil actuator mechanism and to determine whether the plotter carriage is being used in a pen plotter or a pencil plotter mode. The pencil actuator mechanism includes means to move a lead carried by and internal of the lead holder relative to the position of the lead holder and the interlock means aligns the pencil actuator mechanism with the coupling means to enable the pencil actuator mechanism to move the lead.

The novel features which are believed to be characteristic of the invention, both as to its organization and method of operation, together with further objects and advantages thereof, will be better understood from the following description in connection with the accompanying drawings in which the presently preferred embodiment of the invention is illustrated by way of example. It is to be expressly understood, however, that the drawings are for purposes of illustration and description only and are not intended as a definition of the limits of the invention.

BRIEF DESCRIPTION OF THE DRAWINGS

FIG. 1 is a simplified view of a typical plotter carriage moving mechanism coupled to electronics suitable for the operation of the present invention.

FIG. 3 is an isometric view illustrating pencil plotter mode sensor means for use in the present invention.

FIG. 4 is an isometric view illustrating an alternative pencil plotter mode sensor means for use in the present invention.

FIG. 5 is a cross-sectioned view of FIG. 4 taken along line 5—5 of FIG. 4.

DESCRIPTION OF THE PREFERRED EMBODIMENT

Figure 2:
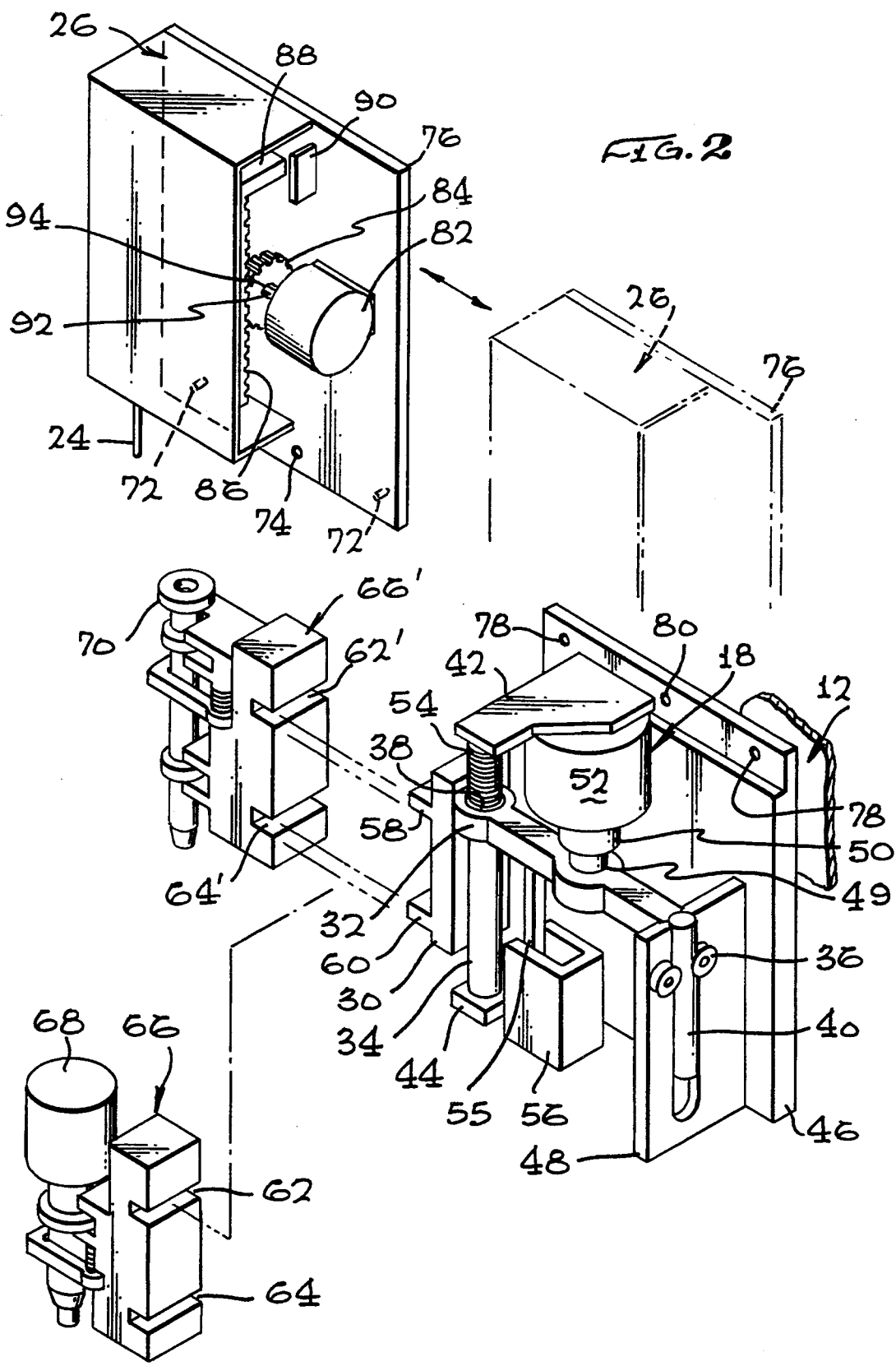
FIG. 2 is an isometric view of the present invention illustrating the construction and modes of operation thereof.

Referring now to FIG. 1, a drawing instrument 10 is shown coupled to a plotter carriage 12. The plotter carriage 12 rides on a beam 14, and the plotter carriage 12 and the beam 14 comprise a linear motor system and are activated by plotter control 16. The drawing instrument 10 is coupled to an actuator mechanism 18 which causes the drawing instrument 10 to move toward and away from the surface 20 of a drawing media 22 when activated by plotter control 16. In the configuration of the invention shown in FIG. 1, the drawing instrument 10 is a lead holder and is positioned to receive a pusher rod 24 from a pencil actuator mechanism 26 which drives a lead 28 toward the surface 20 of the drawing media 22. The pencil actuator mechanism 26 drives the pusher rod 24 toward and away from the surface 20 and is also activated by the plotter control 16. As is described more fully in my copending patent application, Ser. No. 07/835,509, filed Feb. 14, 1992, entitled "Actuator Mechanism for a Pencil Carriage", assigned to the same assignee as the assignee of the present invention, plotter control 16 also receives sensor information from and about the positions of the actuator mechanism 18 and the pencil actuator mechanism 26, including the pusher rod 24, and coordinates the movements of the pencil actuator mechanism 26 and the actuator mechanism 18, when appropriate.

As is shown in FIG. 2, actuator mechanism 18 includes a coupler 30 attached to an actuator arm 32 which rides on shaft 34 to one end and guide bearings 36 at the other end. The actuator arm 32 has a bushing 38 which rides on the shaft 34 and a depending portion 40 which rides between the guide bearings 36. The shaft 34 is supported by arms 42, 44 which are coupled to backplate 46 which in turn is coupled to plotter carriage 12 shown in FIG. 1. Supporting plate 48 which carries guide bearings 36 is also coupled to backplate 46. Actuator arm 32 is coupled to rod 49 which in turn is coupled to the rotor portion 50 of a linear motor 52 supported by backplate 46. Upon activation by plotter control 16, the linear motor 52 thus drives the actuator arm 32 and the coupler 30 toward the surface 20 of the drawing media 22 and upon deactivation the restoring spring 54 coupled to shaft 34 returns the actuator arm 32 and the coupler 30 to the up position. As described in my above-recited copending patent application, rod 55 and sensor element 56 are used to sense the up and down positions of the linear motor 52.

The coupler 30 has male index features 58, 60 thereon positioned to mate with female index features 62, 64 on the finger mechanism 66 supporting pen holder 68, such finger mechanism being similar to the finger mechanism described in my copending patent application, Ser. No. 07/834,967, filed Feb. 14, 1992, entitled "Finger Mechanism for a Lead Holder" now abandoned, assigned to the same assignee as the assignee of the present invention. Thus in the pen plotter mode, the pen holder 68 is attached to coupler 30 by the mating of index features 58, 60, 62, 64 and is driven toward and away from the surface 20 by the actuator mechanism 18.

In the pencil plotter mode, the male index features 58, 60 on the coupler 30 mate with female index features 62', 64' on the finger mechanism 66' supporting lead holder 70, such finger mechanism 66' being similar to the finger mechanism described in my above-recited copending patent application. In addition, pencil actuator mechanism 26 is coupled to actuator mechanism 18 by dowels 72 and shoulder screw 74 located on backplate 76 inserted into corresponding apertures 78, 80 on backplate 46. The dowels 72, and shoulder screw 74 and the apertures 78, 80 are located so that the pusher rod 24 is positioned above the lead holder 70 and is capable of driving lead 28 toward the surface 20 of the drawing media 22 upon activation by plotter control 16 of the DC motor 82 coupled to backplate 76 which drives, by means of pinion gear 84, the rack 86, support bar 88 and pusher rod 24 toward and away from the surface 20 of the media 22. The up and down positions of the support bar 88 are sensed by position sensor 90 and electrically relayed to and recorded by plotter control 16, as is the position of shaft 92 of the motor 82 by shaft encoder 94 electrically coupled to the shaft 92. The movement of the pencil actuator mechanism 26, including the pusher rod 24, are controlled by the plotter control 16 and synchronized by the plotter control 16 with the movement of the lead holder 70 by the actuator mechanism 18, as described in my above-recited coupling patent application.

In operation, the particular mode, i.e. pen or pencil plotter, in which the plotter carriage 12 is operating can be set by the operator of the plotter setting a switch on the plotter control 16 depending on whether the lead holder 70 and the pencil actuator mechanism 26 have been coupled to the actuator mechanism 18. Alternatively, as shown in FIG. 3, the finger mechanism 66' can. have a male index feature 96 coupled thereto and adapted to be inserted into a female index feature 98 on coupler 30' having a sensor 100 therein. The output of sensor 100 is coupled to the plotter control 16 and indicates that the lead holder 70 is coupled to the actuator mechanism 18 and that the plotter carriage 12 is to be operated in the pencil plotter mode. In another embodiment, as shown in FIGS. 4 and 5, a sensor 102 having a hole 104 therein is coupled to backplate 46 over aperture 78 so that when dowel 72 is inserted into aperture 78 the output of sensor 102 is coupled to plotter control 16 and indicates that the pencil actuator mechanism 26 is coupled to the actuator mechanism 18 and that the plotter carriage 12 is to be operated in the pencil plotter mode. Finally, both sensor 100, along with index features 96, 98, and sensor 102 can be used together to assure that both the finger mechanism 66' and the pencil actuator mechanism 26 are properly coupled to the actuator mechanism 18.

While the invention has been described with reference to a particular embodiment, it should be understood that the embodiment is merely illustrative as there are numerous variations and modifications which may be made by those skilled in the art. Thus, the invention is to be construed as being limited only by the spirit and scope of the appended claims.

We claim:

1. An actuator mechanism for a plotter carriage for use with a pen holder in a pen plotter mode or a lead holer in a pencil plotter mode comprising:
   coupling means for selectives engaging a support means for supporting said a pen holder or a support means for supporting said lead holder;
   driving means for driving said coupling means toward and away from a drawing media surface; and
   interlock means for coupling said driving said pencil actuator mechanism and coupling means to a pencil actuator mechanism moving a lead carried by said lead holder when said plotter carriage is in said pencil plotter mode.

2. The actuator mechanism of claim 1 further including sensor means for sensing whether said plotter carriage is to be used in said pen plotter mode or said a pencil plotter mode.

3. The actuator mechanism of claim 2 wherein said sensor means senses whether said pencil actuator mechanism is coupled to said driving and coupling means by said interlock means.

4. The actuator mechanism of claim 2 wherein said sensor means senses whether said coupling means is engaged with said support means for said pen holder or said support means for said lead holder.

5. The actuator mechanism of claim 1 wherein said support means for said pen holder and said support means for said lead holder have index features and said coupling means has index features common to said index features of said support means for said pen holder and said support means for said lead holder.

6. The actuator mechanism of claim 5 wherein said index features comprise a plurality of male members for insertion into corresponding female members.

7. The actuator mechanism of claim 4 wherein said sensor means is coupled to said coupling means and is activated by the engagement of said support means for said pencil holder with said coupling means.

8. The actuator mechanism of claim 1 wherein said pencil actuator mechanism includes means for moving a lead carried by and internal of said lead holder relative to a position of said lead holder and said interlock means aligns said pencil actuator mechanism with said coupling means to enable said pencil actuator mechanism to move said lead.

9. The actuator mechanism of claim 8 wherein said pencil actuator mechanism and said driving means each include a motor coupled to a synchronizing means for synchronizing said motors to control the position of said lead relative to said lead holder and said drawing media surface.

* * * * *